United States Patent
Kuretake (10) Patent No.: US 8,774,998 B2
(45) Date of Patent: Jul. 8, 2014

(54) VEHICLE CONTROL DEVICE

(75) Inventor: Ken Kuretake, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/375,289

(22) PCT Filed: Dec. 2, 2010

(86) PCT No.: PCT/JP2010/071609
§ 371 (c)(1),
(2), (4) Date: Nov. 30, 2011

(87) PCT Pub. No.: WO2012/073373
PCT Pub. Date: Jun. 7, 2012

(65) Prior Publication Data
US 2013/0245866 A1    Sep. 19, 2013

(51) Int. Cl.
*B60L 9/00* (2006.01)
(52) U.S. Cl.
USPC .......................................................... 701/22
(58) Field of Classification Search
None
See application file for complete search history.

(56) References Cited

U.S. PATENT DOCUMENTS

| | | | |
|---|---|---|---|
| 6,314,347 B1 | 11/2001 | Kuroda et al. | |
| 2003/0190995 A1* | 10/2003 | Aoki | 477/5 |
| 2006/0097577 A1* | 5/2006 | Kato et al. | 307/10.1 |
| 2010/0025160 A1* | 2/2010 | Bojji et al. | 185/33 |
| 2010/0138093 A1* | 6/2010 | Oku et al. | 701/22 |
| 2012/0203414 A1* | 8/2012 | Akutsu et al. | 701/22 |

FOREIGN PATENT DOCUMENTS

| | | |
|---|---|---|
| DE | 10 2007 018 733 | 10/2008 |
| JP | 2000-333305 | 11/2000 |
| JP | 2002-373396 | 12/2002 |
| JP | 2005-160269 | 6/2005 |
| JP | 2007-221889 | 8/2007 |
| JP | 2009-289080 | 12/2009 |
| JP | 2009-296733 | 12/2009 |

* cited by examiner

*Primary Examiner* — Thomas Tarcza
*Assistant Examiner* — Adam Alharbi
(74) *Attorney, Agent, or Firm* — Finnegan, Henderson, Farabow, Garrett & Dunner, LLP (57) ABSTRACT

Provided is a vehicle control device 1 for supporting deceleration in order to stop a vehicle at a predetermined stop location, the vehicle control device 1 including energy regeneration amount computation means 11 for computing an energy regeneration amount caused by deceleration, and operational timing determination means 12 for determining an operational timing in the deceleration based on the energy regeneration amount. It is possible to realize traveling of the vehicle with excellent fuel consumption without degrading the overall energy regeneration amount when the vehicle stops.

8 Claims, 10 Drawing Sheets

VEHICLE CONTROL DEVICE

CROSS-REFERENCE TO RELATED APPLICATIONS

This application is a national phase application of International Application No. PCT/JP2010/071609, filed Dec. 2, 2010, the contents of which are incorporated herein by reference.

TECHNICAL FIELD

The present invention relates to a vehicle control device.

BACKGROUND ART

As a technique of the related art, there is known, for example, a device for providing signal information disclosed in Japanese Unexamined Patent Application Publication No. 2002-373396. A device for providing signal information is to provide an optimal travel method at an intersection depending on a traffic signal state and a vehicle state. If it is determined that the vehicle is not able to cross the intersection within a remaining time of a green signal, the vehicle is made to stop at the stop line by smoothly decelerating the velocity from the current position to the stop line of the intersection.

CITATION LIST

Patent Literature

[Patent Literature 1] Japanese Unexamined Patent Application Publication No. 2002-373396

SUMMARY OF INVENTION

Technical Problem

However, in a case where the vehicle is made to stop at the stop line by smoothly decelerating at a constant deceleration velocity from the current position to the stop line at the intersection as in the device for providing signal information disclosed in the Patent Literature1, for example, if a brake timing is delayed, there is a problem in that the energy regeneration amount is degraded as a whole in comparison with that of the related art, and fuel consumption is lowered.

In this regard, an object of the present invention is to provide a vehicle control device capable of realizing traveling of a vehicle having excellent fuel consumption without degrading the energy regeneration amount as a whole at the time of vehicle stop.

Solution to Problem

According to an aspect of the invention, there is provided a vehicle control device for supporting deceleration to stop a vehicle at a predetermined stop location, including: energy regeneration amount computation means for computing an energy regeneration amount by the deceleration; and operational timing determination means for determining an operational timing of the deceleration based on the energy regeneration amount.

According to the present invention, it is possible to obtain a desired energy regeneration amount and realize traveling of the vehicle with excellent fuel consumption by computing the energy regeneration amount caused by deceleration and determining the operational timing of the deceleration based on the computed energy regeneration amount.

In the present invention, it is preferable that the operational timing determination means determine the operational timing in deceleration so as not to be delayed in comparison with a predetermined operational timing obtained from a distance from the vehicle to the stop location, a vehicle velocity, and a deceleration velocity. It is possible to increase the energy regeneration amount by determining the operational timing in the deceleration not to be delayed in comparison with the predetermined timing described above.

It is preferable that the deceleration velocity be constant at the timing of the predetermined operation. If the deceleration at the time of computing the predetermined operational timing is a constant deceleration, it is possible to further increase the energy regeneration amount determined by the operational timing determination means so as not to delay the operational timing of deceleration in comparison with the predetermined timing.

In the present invention, it is preferable that the operational timing determination means determines an operational timing of the deceleration in a region where regeneration efficiency relating to the energy regeneration amount is higher than regeneration efficiency in the travel pattern where a vehicle travels at a constant deceleration velocity. It is possible to further increase the energy regeneration amount by determining the operational timing in the deceleration in a region where the regeneration efficiency relating to the energy regeneration amount is high.

In addition, it is preferable that an operation of the deceleration includes acceleration-off and brake-on subsequent to the acceleration-off. It is possible to operate the brake early and increase the energy regeneration amount by initiating deceleration through acceleration-off while the acceleration open/close level is adjusted and then performing the brake-on.

It is preferable that the deceleration velocity of the vehicle be reduced so as not to delay the acceleration-off in comparison with the predetermined operational timing. It is possible to perform the brake-on in a region where the regeneration efficiency relating to the energy regeneration amount is high and further increase the energy regeneration amount by adjusting the acceleration open/close level so as not to delay the acceleration-off in comparison with a predetermined operational timing and reducing the deceleration velocity of the vehicle.

In addition, it is preferable that a braking control be performed at the time of the brake-on. It is possible to prevent a delay of the brake timing by performing the braking control.

In the present invention, it is preferable the vehicle control device further include operational timing notification means for notifying a driver of the vehicle of the operational timing based on the energy regenerating amount. It is possible to expedite an operational timing of deceleration in comparison with the predetermined timing described above by notifying a driver of the vehicle of the operational timing based on the energy regeneration amount.

It is preferable that the energy regeneration amount be computed by considering a driver's operational timing in the past. It is possible to more appropriately compute the energy regeneration amount by considering the driver's past operational timing.

According to another aspect of the invention, there is provided a vehicle control device for supporting deceleration to stop a vehicle at a predetermined stop location, including: energy regeneration amount computation means for computing an energy regeneration amount caused by the deceleration; operational timing determination means for determining an operational timing in the deceleration based on the energy regeneration amount; and operation control means for controlling the operation. In the vehicle control device described above, the energy regeneration amount caused by the deceleration is computed, the operational timing in the deceleration is determined based on the computed energy regeneration amount, and the deceleration is supported by controlling the operation. As a result, it is possible to prevent a delay of the brake timing and realize traveling of the vehicle with excellent fuel consumption without degrading the overall energy regeneration amount obtained until the vehicle stops at a predetermined stop location.

According to still another aspect of the present invention, there is provided a vehicle control device for supporting deceleration to stop a vehicle at a predetermined stop position, including: energy regeneration amount computation means for computing an energy regeneration amount caused by deceleration; operational timing determination means for determining an operational timing in the deceleration based on the energy regeneration amount; and operational timing notification means for notifying a driver of the vehicle of the operational timing. In the vehicle control device described above, the energy regeneration amount caused by deceleration is computed, the operational timing in deceleration is determined based on the computed energy regeneration amount, and deceleration is supported by notifying a driver of the vehicle of the aforementioned timing. As a result, it is possible to prevent a delay of the operation timing in the deceleration in comparison with the predetermined timing described above and realize traveling of the vehicle with excellent fuel consumption without degrading the overall energy regeneration amount obtained until the vehicle stops at a predetermined stop position.

Advantageous Effects of Invention

According to the present invention, it is possible to provide a vehicle control device capable of realizing traveling of the vehicle with excellent fuel consumption without degrading the overall energy regeneration amount when the vehicle stops.

DESCRIPTION OF EMBODIMENTS

Hereinafter, preferable embodiments of the present invention will be described with reference to the accompanying drawings.

Figure 1:
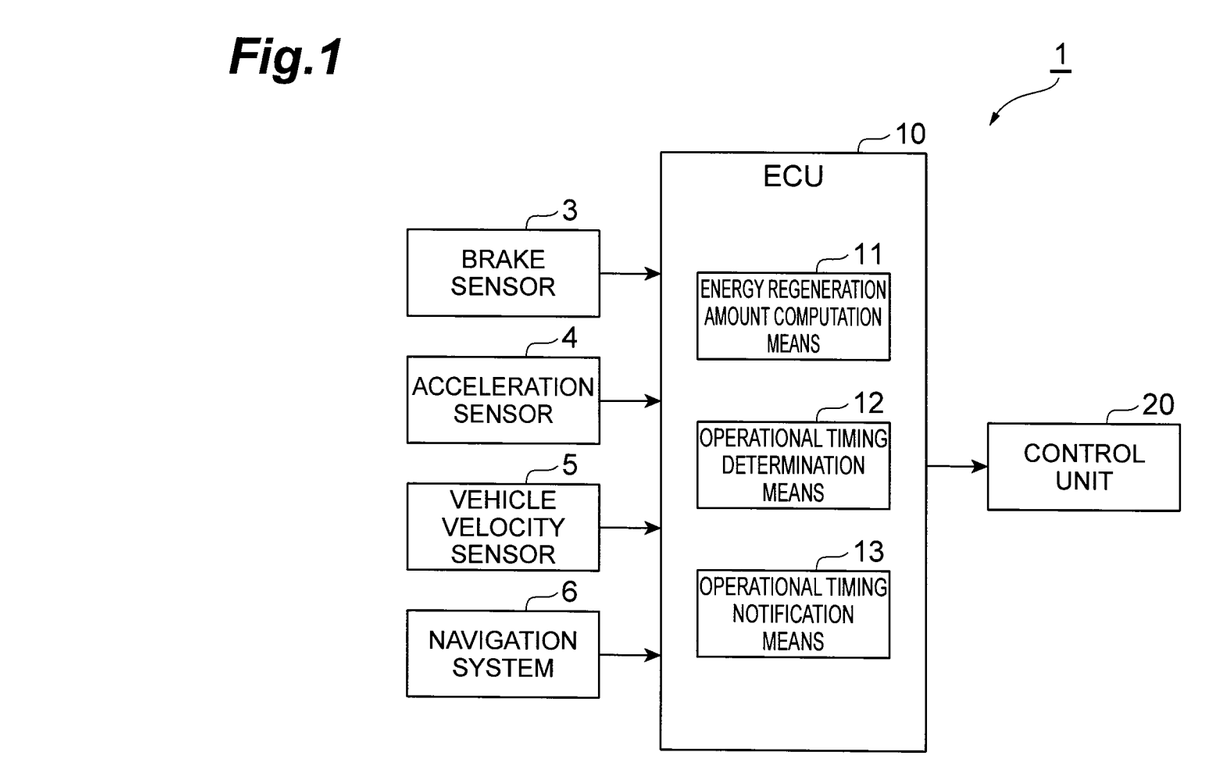
FIG. 1 is a block diagram illustrating a configuration of a vehicle control device according to an embodiment of the invention.

FIG. 1 is a block diagram illustrating a configuration of a vehicle control device 1 according to an embodiment of the invention. The vehicle control device 1 is a device which is mounted on a vehicle, computes the energy regeneration amount caused by deceleration, determines the operational timing of deceleration based on the computed energy regeneration amount, and supports deceleration. The vehicle control device 1 includes a brake sensor 3, an acceleration sensor 4, a vehicle velocity sensor 5, a navigation system 6, an electronic control unit (ECU) 10, and a control unit 20.

The brake sensor 3 is a sensor for determining a manipulation amount of a brake pedal by a driver. In the brake sensor 3, the detected brake manipulation amount is transmitted to the ECU 10 as a brake signal.

The acceleration sensor 4 is a sensor for determining a manipulation amount of an accelerator pedal by the driver. In the acceleration sensor 4, the detected acceleration manipulation amount is transmitted to the ECU 10 as an acceleration signal.

The vehicle velocity sensor 5 is used to detect the vehicle velocity. For example, the vehicle velocity sensor 5 is provided in each of the four wheels of the vehicle to detect the vehicle velocity from the rotating velocity of the wheels and transmit the vehicle velocity information to the ECU 10.

The navigation system 6 obtains the signal information at the intersection or the infrastructure information such as the traffic jam information, and serves to store the road information such as a shape of a curved road and a location where vehicles need to travel slowly. For example, if the signal information at the intersection is received, the navigation system 6 detects a stop location closest to the signal forward in the vehicle travel direction, obtains the distance between the host vehicle and the stop location, and transmits the distance as a vehicle navigation signal to the ECU 10.

The ECU 10 includes a central processing unit (CPU), a read only memory (ROM), a random access memory (RAM), an input/output port, and the like. The CPU is operated to read/write data of the RAM depending on a control program stored in the ROM. The ECU 10 having the energy regeneration amount computation unit 11, the operational timing determination unit 12, and the operational timing notification unit 13 is electrically connected to the brake sensor 3, the acceleration sensor 4, and the vehicle velocity sensor 5, the navigation system 6, and the control unit 20.

The energy regeneration amount computation unit 11 computes the energy regeneration amount that can be obtained up to the stop location when the vehicle stops. Since the energy regeneration amount varies depending on the acceleration-off timing, the brake-on timing, or whether or not the regeneration efficiency is in the high area, it is preferable that the energy regeneration amount be computed based thereon.

The operational timing determination unit 12 determines the operational timing of the vehicle deceleration based on the computed energy regeneration amount. For example, in order to obtain the computed energy regeneration amount using the regenerative brake, the timing of acceleration-off or brake-on is determined such that the acceleration-off is initiated at 50 m away from the start in the advancing direction, and the brake-on is initiated at 100 m in front.

In addition, it is preferable that the operational timing determination unit 12 determine so as not to delay the operational timing of the deceleration in comparison with a predetermined operational timing obtained from the distance from the vehicle to the stop location, the vehicle velocity, and vehicle deceleration. As the predetermined timing described above, for example, the vehicle may stop by performing deceleration at a constant deceleration velocity after initiating the acceleration-off. However, in this case, it is difficult to operate the regenerative brake in the high regeneration efficiency region, and the energy regeneration amount may not increase. Therefore, by determining the operational timing of deceleration so as not to be later than the predetermined timing described above, it is possible to operate the regenerative brake in the high regeneration efficiency region and increase the energy regeneration amount. In addition, here, "not to be later" means that the operation timing of the deceleration is at least equal to or faster than the predetermined timing described above. The "constant deceleration velocity" means that a constant deceleration velocity is guaranteed even if a slight difference exists.

The operational timing notification unit 13 notifies a driver of the vehicle of the operational timing determined based on the computed energy regeneration amount. A driver performs acceleration-off or brake-on based on the notified timing. As a result, it is possible to obtain the computed energy regeneration amount.

The control unit 20 controls the manipulation amount relating to the acceleration-off or the brake-on based on the output from the ECU 10. For example, by controlling the manipulation of acceleration-off or brake-on using the control unit 20, it is possible to prevent the early brake operation from being delayed and the energy regeneration amount from being lower than the computation value.

Figure 2:
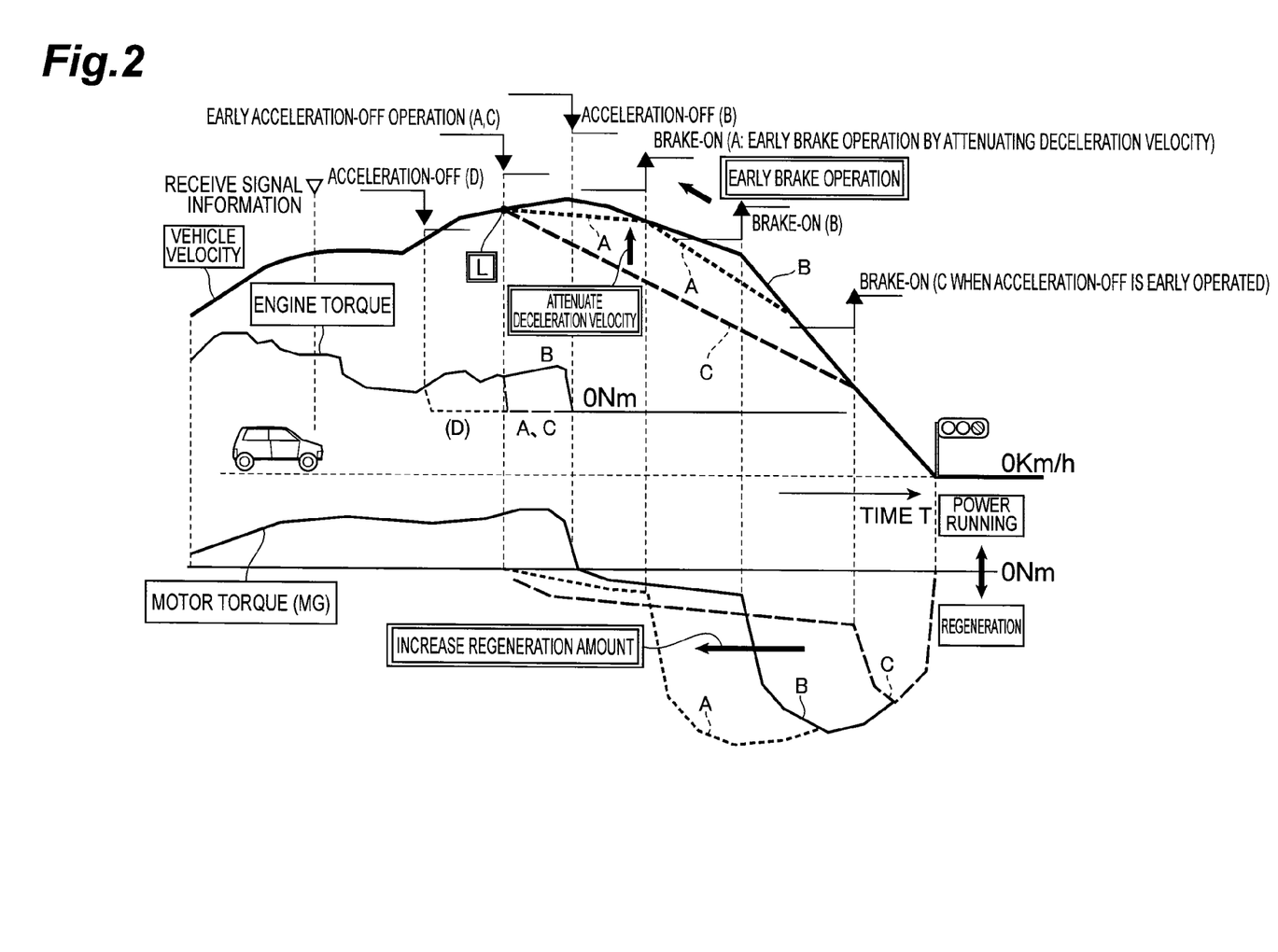
FIG. 2 is a schematic diagram illustrating the energy regeneration amount obtained until the vehicle having the vehicle control device of FIG. 1 stops at a signal in comparison with the travel pattern of the related art.

FIG. 2 is a schematic diagram illustrating the energy regeneration amount obtained until the vehicle having the aforementioned vehicle control device stops at a signal in comparison with the travel pattern of the related art. As shown in FIG. 2, in the travel pattern (B) of the related art, since a driver steps on the accelerator to increase a velocity even beyond L-point, acceleration-off (B) is delayed. In addition, by performing brake-on (B) further after a certain period of time, the vehicle stops at a signal, and the energy regeneration amount (B) is obtained. In the travel pattern (C) of the related art, although the early acceleration-off operation (C) is performed at L-point, coasting traveling (such as free-run traveling and engine-brake traveling) is made at a constant deceleration velocity. Therefore, since the energy regeneration amount is small, and the timing of the brake-on (C) is also later than that of the travel pattern (B), the energy regeneration amount (C) is smaller than that of the travel pattern (B).

In contrast, in the travel pattern (A) of the vehicle having the vehicle control device of the present invention, similar to the travel pattern (C), although the early acceleration-off operation (A) is performed at the L-point, the deceleration velocity caused by the acceleration-off is attenuated in comparison with the travel pattern (C) in which deceleration is performed at a constant deceleration velocity as described above, and then, the early brake-on (A) is performed. As a result, the energy regeneration amount (A) increases in comparison with that of travel patterns (B) and (C).

Figure 3:
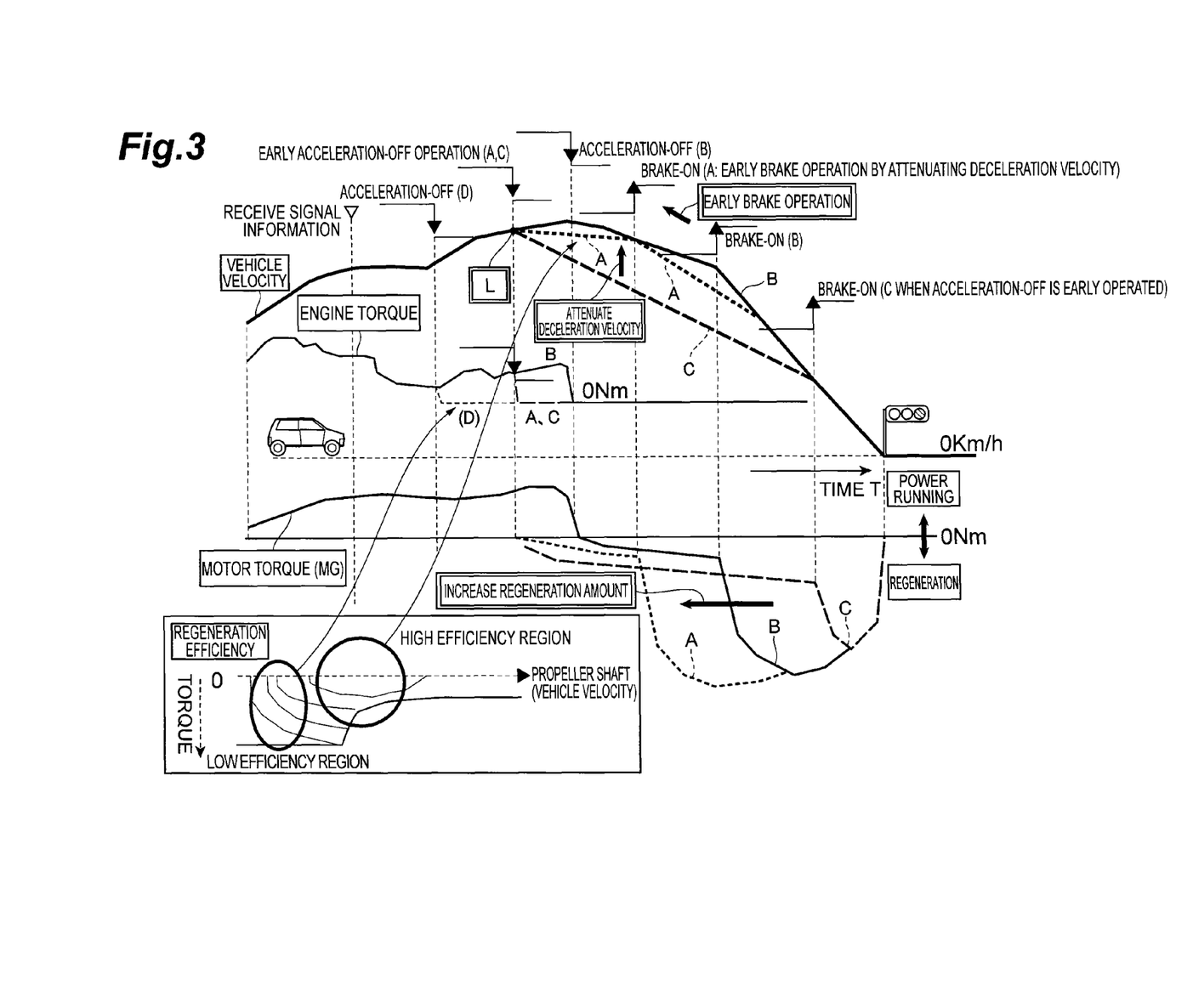
FIG. 3 is a schematic diagram illustrating the energy regeneration amount obtained until the vehicle having the vehicle control device of FIG. 1 stops at a signal using the regeneration efficiency map.

FIG. 3 is a schematic diagram illustrating the energy regeneration amount obtained until the vehicle having the aforementioned vehicle control device stops at a signal using a regeneration efficiency map. As shown in the regeneration efficiency map on the lower left of FIG. 3, in the high regeneration efficiency region, it is possible to obtain a higher energy regeneration amount (A) by attenuating the deceleration velocity as in the travel pattern (A) and then operating the brake early. In addition, in the low regeneration efficiency region, it is preferable to promote fuel consumption by performing acceleration-off earlier as in the travel pattern (D) and cutting the fuel in the traveling.

Figure 4:
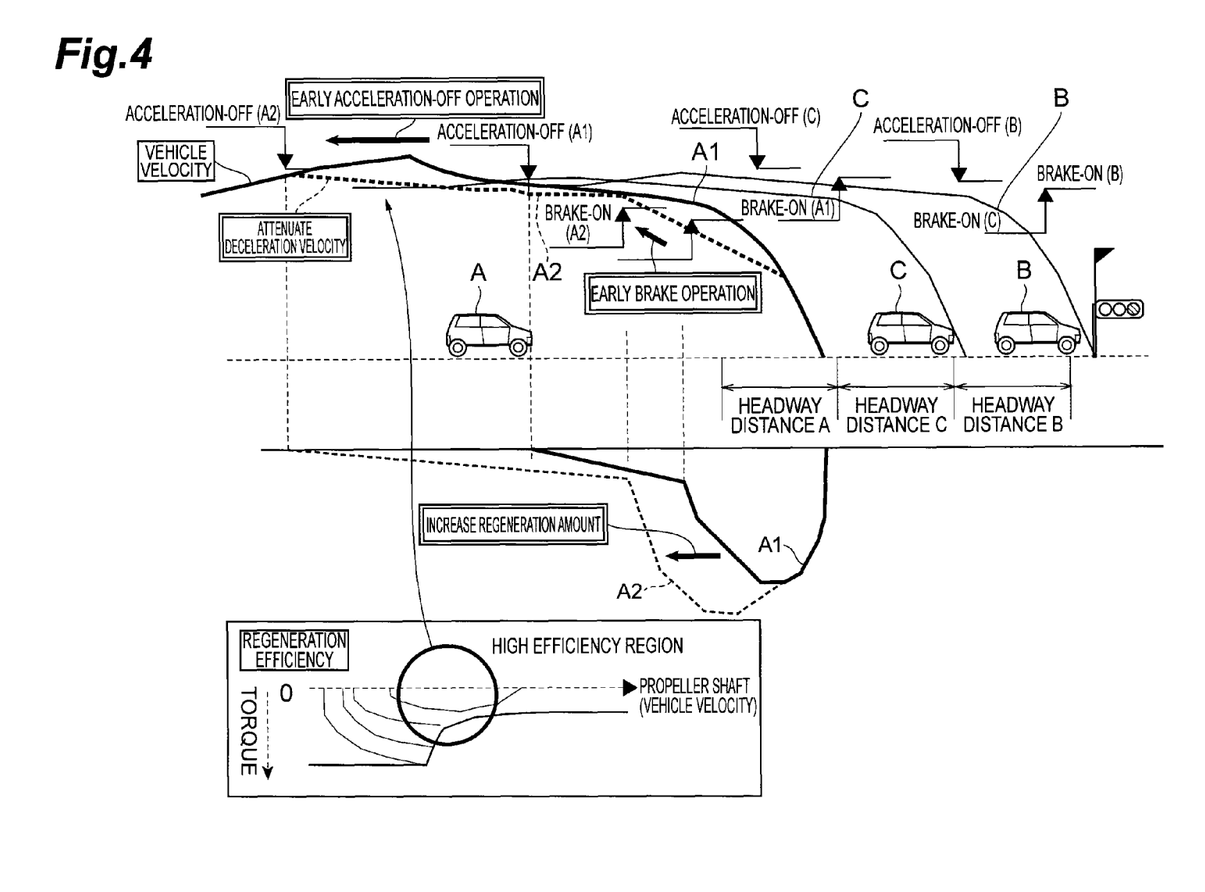
FIG. 4 is a schematic diagram illustrating the energy regeneration amount obtained by the vehicle having the vehicle control device of FIG. 1 at the time of a traffic jam in comparison with the travel pattern of the related art.

FIG. 4 is a schematic diagram illustrating the energy regeneration amount obtained when the vehicle having the aforementioned vehicle control device is in a traffic jam in comparison with the travel pattern of the related art. As shown in FIG. 4, when the vehicle B or the vehicle C preceding the vehicle A approaches a traffic jam, the vehicle B or C is decelerated or stopped by performing the acceleration-off (B, C) and the brake-on (B, C) before entering the traffic jam. Here, in the travel pattern (A1) of the vehicle A of the related art, if the acceleration traveling is performed by the acceleration-on, and a traffic jam in front of the vehicle is recognized, the vehicle is decelerated or stopped in front of the vehicle C by performing the acceleration-off (A1) and then the brake-on (A1) so that the energy regeneration amount (A1) is obtained.

In contrast, in the travel pattern (A2) of the vehicle A having the vehicle control device of the present invention, information such as the vehicle velocity of the vehicles B and C traveling in front, and the timing of acceleration-off or brake-on is obtained as infrastructure information, and the expected stop location of the vehicle B is estimated. By adding the headway distance B and the headway distance C to the expected stop location of the vehicle B, the headway distance A where the vehicle A is to stop is estimated. The acceleration-off is early operated aiming at the headway distance A (A2). While the deceleration velocity is attenuated in comparison with the travel pattern (not shown) in which the coasting travel is performed at a constant deceleration, the brake-on is operated early in a high regeneration efficiency region (A2). As a result, the energy regeneration amount (A2) increases in comparison with the travel pattern (A1). In addition, if the vehicle B stops at a traffic signal, the stop time of the vehicle B may be computed from a red signal time, a stop lime location or the like. If the vehicle temporarily stops, the stop time of the vehicle B may be computed from a stop line. And the stop location of the vehicle A (headway distance A) may be computed from the stop time.

Figure 5:
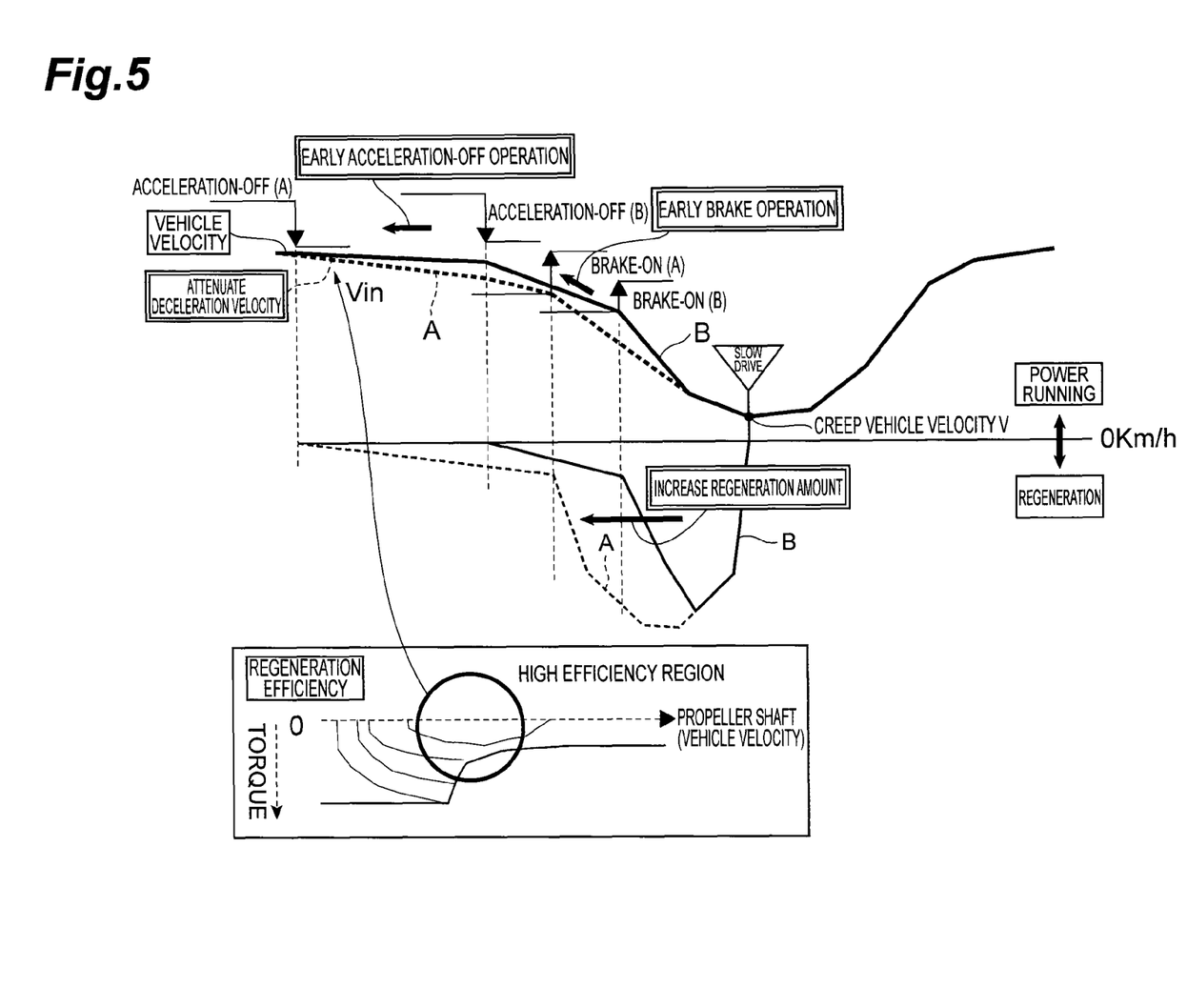
FIG. 5 is a schematic diagram illustrating the energy regeneration amount obtained when the vehicle having the vehicle control of FIG. 1 is driven slowly in comparison with the travel pattern of the related art.

FIG. 5 is a schematic diagram illustrating the energy regeneration amount obtained when the vehicle having the vehicle control of FIG. 1 travels slowly in comparison with the travel pattern of the related art. For example, the "travel slowly" means a velocity at which a vehicle can stop within a distance of 1 m after a driver steps on the brake or a low velocity equal to or lower than 10 km/h. In addition, a location where a vehicle is to travel slowly (a slow-drive region) includes, for example, a location having a traffic sign of "drive slow", an intersection entrance without views of the left and the right, a location having a yellow blinking signal, a vicinity of the corner of the road, a steep slope road, and the like. In the case of the slow drive, the slow-drive region is obtained as infrastructure information and the vehicle travels while safety in the slow-drive region is ensured by an extremely-low vehicle velocity (creep vehicle velocity V) in the vicinity of the creep. In this case, a vehicle velocity (Vin) aims at the creep vehicle velocity V, and the acceleration-off is operated early (A) in comparison with the travel pattern (B) of the related art. By operating the brake-on (A) early in a high regeneration efficiency region while attenuating the deceleration velocity in comparison with the travel pattern (not shown) so as to perform the coasting traveling at a constant deceleration velocity, it is possible to increase the energy regeneration amount (A) in comparison with travel pattern (B).

Figure 6:
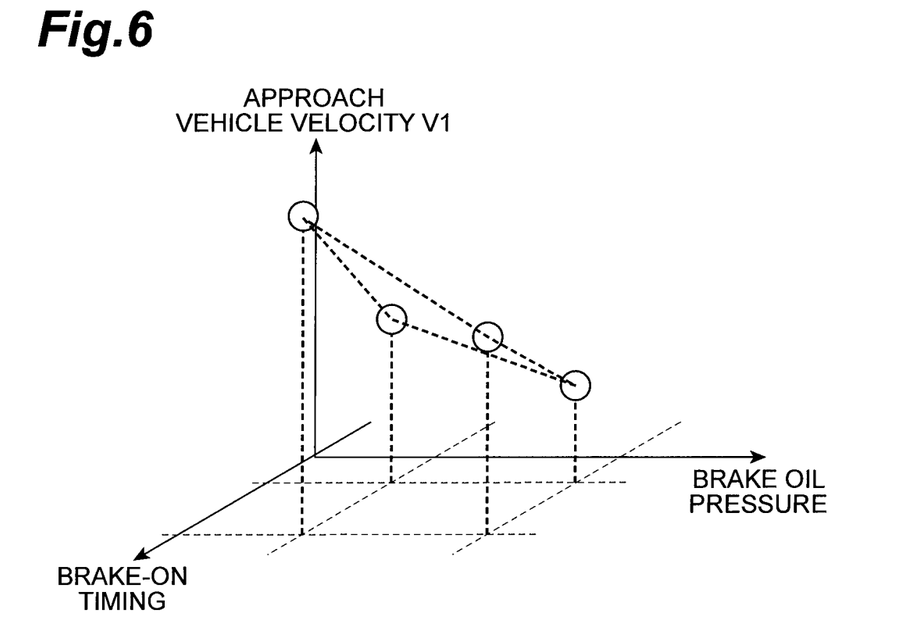
FIG. 6 is a schematic diagram illustrating a relationship between an approach velocity and a brake.
Figure 7:
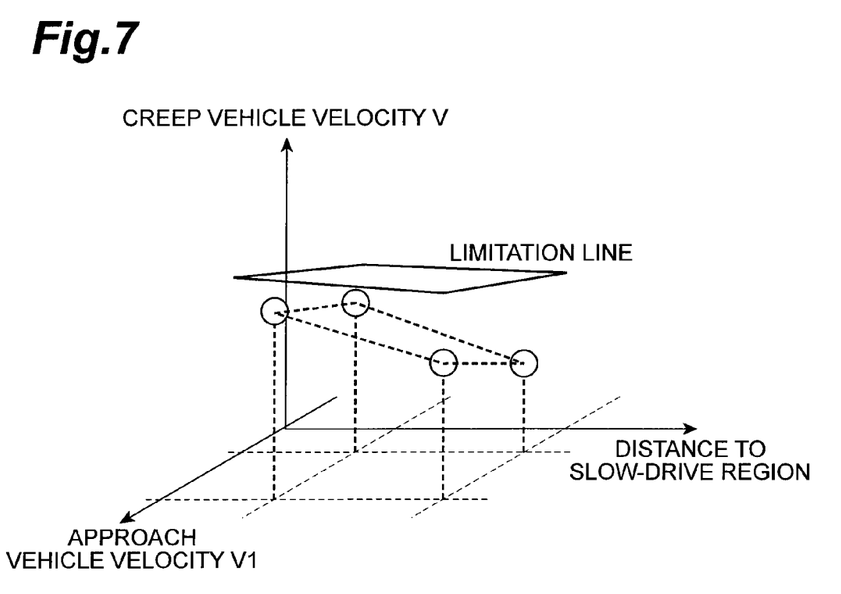
FIG. 7 is a schematic diagram illustrating a relationship between a creep vehicle velocity, an approach velocity, and a distance to a slow-drive region.

FIG. 6 is a schematic diagram illustrating a relationship between the approach velocity and the brake. As shown in FIG. 6, to compute the creep vehicle velocity V, first, the approach velocity V1 is computed from the timing of brake-on and a brake oil pressure. As the timing of brake-on is more delayed, the approach velocity V1 becomes higher. As the brake oil pressure is higher, the approach velocity V1 becomes lower. FIG. 7 is a schematic diagram illustrating a relationship between the creep vehicle velocity, the approach velocity, and the distance to the slow-drive region. As shown in FIG. 7, the creep vehicle velocity V is obtained from the approach velocity V1 and the distance to the slow-drive region. Here, the limitation line in FIG. 7 represents a limitation of the creep vehicle velocity V at which the vehicle can travel slowly while the safety of the vehicle and pedestrians near the vehicle or the like is ensured.

Figure 8:
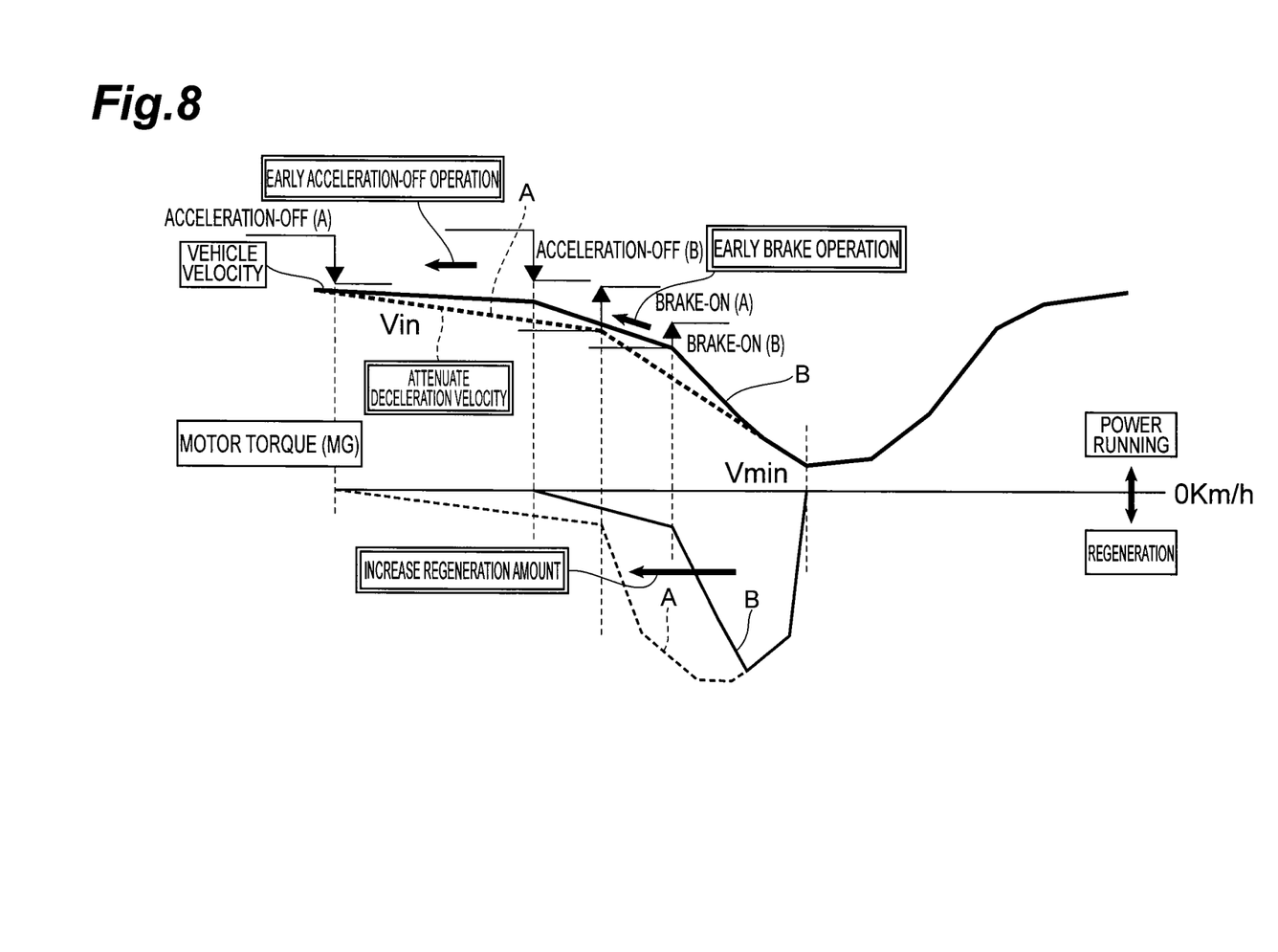
FIG. 8 is a schematic diagram illustrating the energy regeneration amount obtained when the vehicle having the vehicle control device of FIG. 1 travels at a curve in comparison with the travel pattern of the related art.
Figure 9:
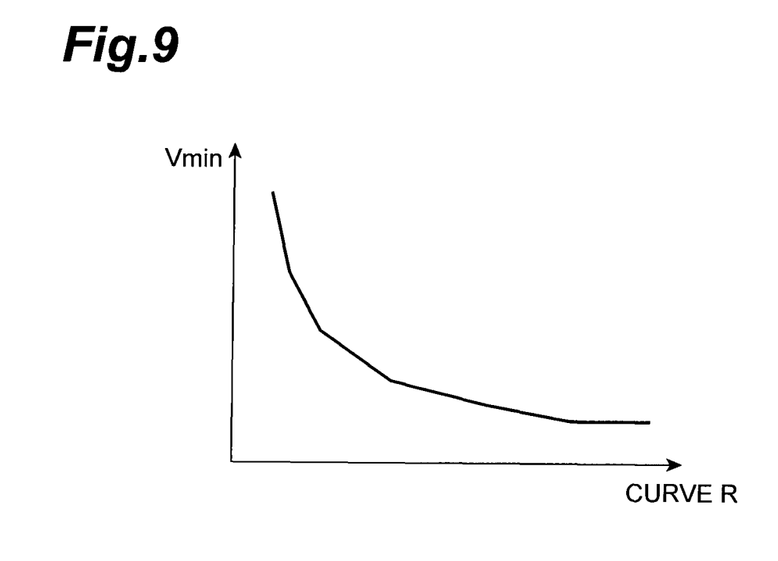
FIG. 9 is a schematic diagram illustrating a relationship between a velocity when a vehicle passes through a curved road and R.

FIG. 8 is a schematic diagram illustrating the energy regeneration amount obtained when the vehicle having the vehicle control device of FIG. 1 travels in a curve in comparison with the travel pattern of the related art. Although the vehicle velocity in the curved road or the R information of the curved road may be obtained as infrastructure information, the minimum velocity (Vmin) for passing through the curved road may be computed from a relationship (FIG. 9) between the velocity of passing through the curved road and R. It is possible to increase the energy regeneration amount (A) in comparison with the travel pattern (B) by operating the acceleration-off (A) and the brake-on (A) earlier than the travel pattern (B) of the related art aiming at the computed Vmin.

Figure 10:
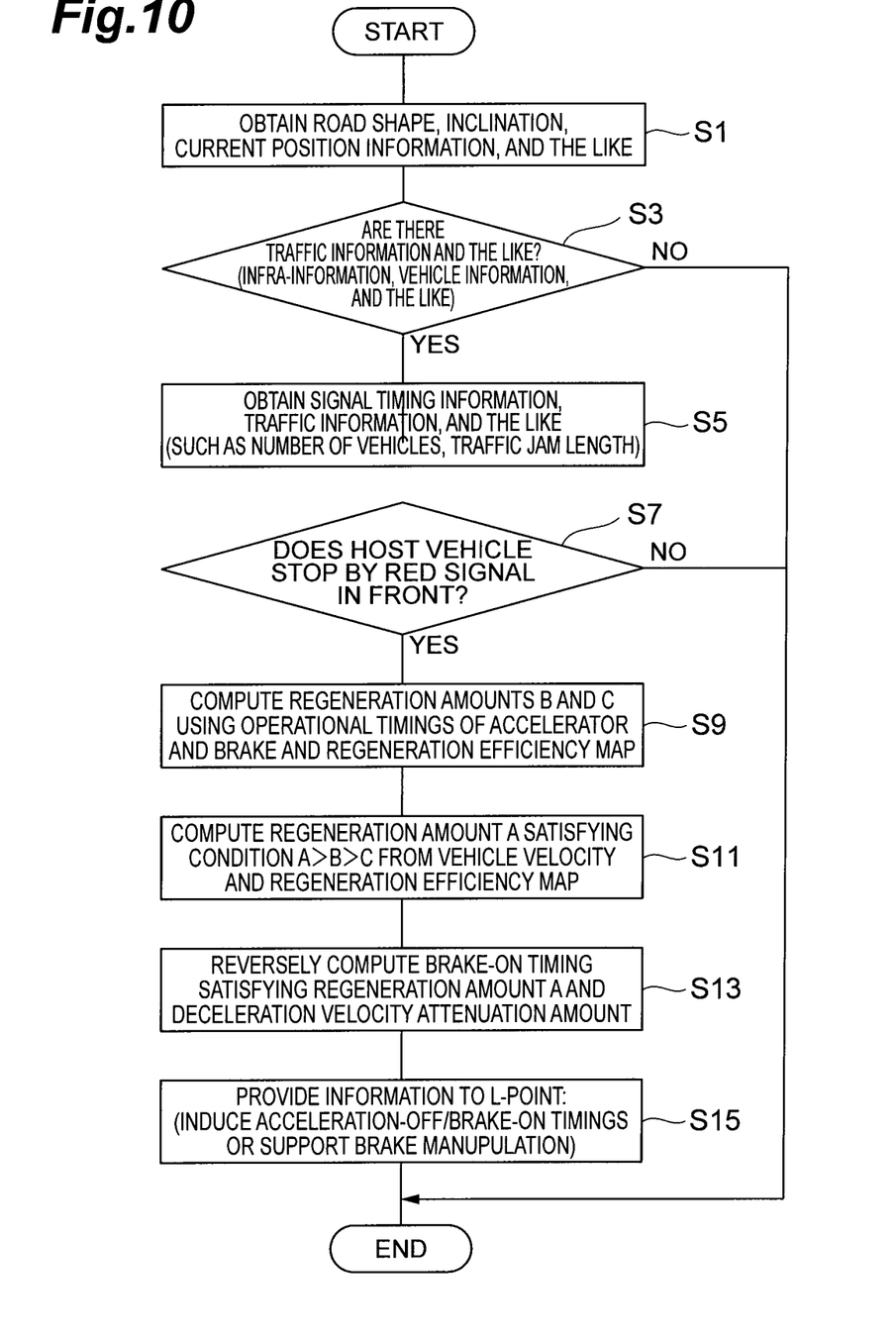
FIG. 10 is a flowchart illustrating an operational procedure until a vehicle having a vehicle control device of FIG. 1 stops at a signal.

FIG. 10 is a flowchart illustrating an operational sequence until the vehicle having the vehicle control device stops at a traffic signal. In S1, a road shape, an inclination, current location information, and the like are obtained. Then, if it is possible to obtain traffic information by infrastructure information and the like (S3), traffic information such as signal timing information, vehicle numbers, and the length of the traffic jam is obtained (S5).

If the traffic signal in front is turned to red so that the host vehicle is to stop according to the obtained signal timing information (S7), the energy regeneration amounts of the travel pattern (B) (when the acceleration-off timing is delayed) shown in FIG. 3 and the travel pattern (C) (when the brake-on timing is delayed) are computed by considering the operational timings of the accelerator and the brake from the past history of the driver and using the regeneration efficiency map, in S9.

In S11, in order to increase the energy regeneration amount in comparison with the travel pattern (B) and the travel pattern (C) computed above, the energy regeneration amount in the case of the travel pattern (A) (when the deceleration velocity is attenuated, and the brake is early operated) is computed by using the vehicle velocity and the regeneration efficiency map, and the timings of acceleration-off and brake-on and the deceleration velocity attenuation amount are reversely computed to fill up the obtained energy regeneration amount in S13.

In S15, the timing of acceleration-off, the deceleration velocity attenuation amount, and the timing of the brake-on are notified or controlled to the driver at the L-point. As a result, it is possible to increase the energy regeneration amount.

As described above, according to the vehicle control device of the present invention, it is possible to obtain the desired energy regeneration amount and realize traveling of the vehicle with excellent fuel consumption by computing the energy regeneration amount caused by deceleration and determining the operational timing of deceleration based on the computed energy regeneration amount.

In addition, the present invention is not limited to the embodiments described above. For example, in a case where the operational timing is notified to a driver of the vehicle based on the computed energy regeneration amount, the timing of the acceleration-off or brake-on may be indicated by voice or an image (through a display on a mobile terminal or a navigation). By providing notification of the operational timing by a voice or an image and the like, it is possible to make it easy for a driver to know the timing of acceleration-off or brake-on and prevent a delay of the timing of acceleration-off or brake-on.

In addition, in a case where the driver's past operational timing is considered in order to compute the energy regeneration amount, for example, it is preferable that the ECU 10 have a database for storing the driver's past history.

The energy regeneration amount may be computed without considering the driver's past operational timing. If the driver's past operational timing is not considered, it is possible to expedite computation of the energy regeneration amount and notification of the operational timing to a driver.

In FIG. 5, if there is no traffic sign of 'slow-drive' in the place such as an intersection entrance incapable of obtaining views of the left and the right, a location having a yellow blinking signal, the vicinity of the corner of a road, and a steep slope road, the slow-drive region may be determined based on the learning from the past (such as a vehicle velocity, the acceleration timing, and the brake timing).

In FIG. 7, the creep vehicle velocity limitation at which the safety of a vehicle can be ensured may be obtained by obtaining information such as the velocity of the vehicle which travels across the slow-drive region, the distance to the slow-drive region, the timing of the acceleration or the brake from infrastructure information, inter-vehicle communication, and the like.

According to the present invention, it is possible to realize the traveling of the vehicle with excellent fuel consumption without degrading the energy regeneration amount as a whole when the vehicle stops.

REFERENCE SIGNS LIST

1 VEHICLE CONTROL DEVICE
3 BRAKE SENSOR
4 ACCELERATION SENSOR
5 VEHICLE VELOCITY SENSOR
6 NAVIGATION SYSTEM
10 ECU
11 ENERGY REGENERATION AMOUNT COMPUTATION UNIT (ENERGY REGENERATION AMOUNT COMPUTATION MEANS)

12 OPERATIONAL TIMING DETERMINATION UNIT (OPERATIONAL TIMING DETERMINATION MEANS)
13 OPERATIONAL TIMING NOTIFICATION UNIT (OPERATIONAL TIMING NOTIFICATION MEANS)
20 CONTROL UNIT

The invention claimed is:

1. A vehicle control device for supporting deceleration to stop a vehicle at a predetermined stop location, comprising:
   energy regeneration amount computation means for computing an energy regeneration amount by the deceleration; and
   operational timing determination means for determining an operational timing of the deceleration based on the energy regeneration amount,
   wherein the operational timing determination means determines the operational timing in the deceleration so as not to be delayed in comparison with a predetermined operational timing obtained from a distance from the vehicle to the stop location, a vehicle velocity, and a deceleration velocity,
   wherein the deceleration velocity is constant at the timing of the predetermined operation, and
   wherein the operational timing determination means determines an operational timing in the deceleration in a region where regeneration efficiency relating to the energy regeneration amount is higher than regeneration efficiency in the travel pattern where the vehicle travels at the constant deceleration velocity.

2. The vehicle control device according to claim 1, wherein an operation of the deceleration includes acceleration-off and brake-on subsequent to the acceleration-off.

3. The vehicle control device according to claim 2, wherein the deceleration velocity of the vehicle is reduced so as not to delay the acceleration-off in comparison with the predetermined operational timing.

4. The vehicle control device according to claim 2, wherein a braking control is performed at the time of the brake-on.

5. The vehicle control device according to claim 1, further comprising operational timing notification means for notifying a driver of the vehicle of the operational timing based on the energy regeneration amount.

6. The vehicle control device according to claim 1, wherein the energy regeneration amount is computed by considering past operational timing of the driver.

7. The vehicle control device according to claim 1, further comprising:
   operation control means for controlling the operation.

8. A vehicle control device for supporting deceleration to stop a vehicle at a predetermined stop location, comprising:
   energy regeneration amount computation means for computing an energy regeneration amount by the deceleration; and
   operational timing determination means for determining an operational timing of the deceleration based on the energy regeneration amount,
   wherein an operation of the deceleration includes acceleration-off and brake-on subsequent to the acceleration-off, and
   wherein the deceleration velocity of the vehicle is reduced so as not to delay the acceleration-off in comparison with the predetermined operational timing.

* * * * *